(12) United States Patent
Kamunen

(10) Patent No.: US 6,902,182 B1
(45) Date of Patent: Jun. 7, 2005

(54) HITCH DEVICE

(76) Inventor: Mark R. Kamunen, 260 Oakview Dr., Shelbyville, KY (US) 40065

( * ) Notice: Subject to any disclaimer, the term of this patent is extended or adjusted under 35 U.S.C. 154(b) by 0 days.

(21) Appl. No.: 10/351,802

(22) Filed: Jan. 27, 2003

(51) Int. Cl.[7] .............................................. B60D 1/07
(52) U.S. Cl. ....................... 280/493; 280/492; 280/656; 280/512; 180/908
(58) Field of Search ................................ 180/233, 908, 180/283; D12/106, 162, 101; 280/400, 492–495, 280/512, 656, 789, 63, 6

(56) References Cited

U.S. PATENT DOCUMENTS

| | | | |
|---|---|---|---|
| 1,288,432 A | 12/1918 | Long | |
| 1,355,640 A * | 12/1920 | Butler | 280/493.1 |
| 1,469,801 A | 10/1923 | McKenney | |
| 2,092,593 A | 9/1937 | Seys | |
| 2,169,449 A | 8/1939 | McCormick | |
| 2,174,468 A * | 9/1939 | Kratfel | 280/491.1 |
| 2,516,813 A | 7/1950 | Valin | |
| 2,569,965 A | 10/1951 | Wiedman | |
| 2,628,107 A | 2/1953 | Schlairet | |
| 2,720,413 A | 10/1955 | Halverson | |
| 2,859,050 A | 11/1958 | Stonerock et al. | |
| 3,981,521 A | 9/1976 | See | |
| 4,035,015 A | 7/1977 | Smith | |
| 4,073,506 A | 2/1978 | Pressley | |
| 4,361,342 A * | 11/1982 | Duffield | 280/498 |
| 4,537,441 A | 8/1985 | McCleary | |
| 4,728,121 A | 3/1988 | Graves | |
| 5,222,753 A | 6/1993 | Parish | |
| 5,267,748 A | 12/1993 | Curran | |
| 5,451,088 A | 9/1995 | Broad | |
| 5,503,423 A | 4/1996 | Roberts et al. | |
| 5,513,868 A | 5/1996 | Barr | |
| 5,678,743 A | 10/1997 | Johnson et al. | |
| 5,707,072 A | 1/1998 | Hopper | |
| 5,730,456 A | 3/1998 | Bowers | |
| 6,203,049 B1 | 3/2001 | Gibson | |
| 6,234,495 B1 | 5/2001 | Velke | |
| 6,283,490 B1 * | 9/2001 | Sciannanteno et al. | 280/493 |
| 6,293,351 B1 | 9/2001 | Schmidt | |
| 6,325,395 B1 | 12/2001 | Frymoyer | |
| 6,378,904 B1 * | 4/2002 | Niehoff | 280/789 |
| 6,536,794 B2 * | 3/2003 | Hancock et al. | 280/511 |
| 6,557,882 B2 * | 5/2003 | Harrington | 280/415.1 |
| 2001/0026060 A1 * | 10/2001 | Cross | 280/456.1 |
| 2002/0195798 A1 * | 12/2002 | James | 280/656 |

* cited by examiner

*Primary Examiner*—Lesley D. Morris
*Assistant Examiner*—Matthew Luby
(74) *Attorney, Agent, or Firm*—James E. Cole; Middleton Reutlinger

(57) ABSTRACT

A hitch device for use with a pulling vehicle and a trailer, including a first hitch arm and a second upwardly directed hitch arm. At a second end of the second upwardly directed hitch arm is a joint allowing rotation about at least two axes. The hitch device positions the joint a preselected vertical and horizontal distance from the pulling vehicle and a hitch receiving structure connected thereto. The hitch device may be used with a trailer having first and second diverters encouraging the trailer to move about a tree or other shrub.

38 Claims, 4 Drawing Sheets

HITCH DEVICE

BACKGROUND OF THE INVENTION

1. Technical Field of the Invention

The present invention relates generally to a Hitch Device. More particularly, the invention relates to a Hitch Device for connecting a trailer to a pulling vehicle, for instance an all-terrain vehicle ('ATV'), and which inhibits the trailer from binding or jamming against the ATV while moving over rugged terrain and about sharp turns associated with off-road travels.

2. Description of the Related Art

The popularity of all-terrain vehicles ('ATVs') has grown recently as uses for ATVs have increased. Typically ATVs may be used for work and recreation in various manners, including camping, hunting, fishing, farm work, and generally accessing geographic areas unreachable with cars and some trucks. ATVs are typically able to cover large distances of rough terrain with ease not available with other four-wheel-drive vehicles.

In many instances, users may desire to haul work or recreational equipment such as camping gear, guns, decoys, stands, and other work or recreational related equipment, tools, or the like. This may be difficult with the limited space available on an ATV cargo or hauling rack, generally located at the front or back of an ATV. Therefore, trailers have been introduced for use with ATVs. However, the ability of ATVs to traverse rough terrain is a problem for typical ATV-trailer connections and hitches. An ATV-trailer connection typically rotates or pivots at the rear end of the ATV and therefore the trailer often binds or jams as the ATV moves over sharp crests or valleys, rough terrains, and/or through turns.

In view of the deficiencies in known vehicle-trailer connections, it is apparent that a hitch device is needed having a joint spaced a preselected vertical and horizontal distance from a pulling vehicle wherein a pulling vehicle and a trailer may traverse rough terrain, through crests and valleys, and move through sharp turns without the trailer binding or jamming against the pulling vehicle.

SUMMARY OF THE INVENTION

It is an object of the present invention to provide a hitch device for connecting a pulling vehicle and a trailer.

It is a further object of this invention to provide a hitch device wherein the hitch device allows movement of the pulling vehicle and trailer across rough terrain, through sharp turns, and through extreme crests and valleys, without binding the pulling vehicle and trailer.

It is an even further objective of this invention to provide a hitch device for use with an ATV and a trailer wherein a rotational joint is positioned adjacent the trailer rather than the pulling vehicle.

The hitch device comprises a hitch receiving structure comprising a receiver bracket and an integral hitch receiver. The receiver bracket is mounted on a receiver stub which is integral with a pulling vehicle, for example an ATV. In accordance with an exemplary embodiment, the receiver bracket is connected by a fastener to a stub extending from the rear axle assembly of an ATV, however the receiver bracket may alternatively be welded to the stub or to the rear axle assembly. The hitch receiver may be a square hollow tube and may be welded to or otherwise formed with the receiver bracket. The hitch receiver may also define a hitch receiver aperture for receiving a pin or other fastener therethrough.

Slidably positioned in the hitch receiver is a first hitch arm. The first hitch arm, as exemplary, may be a square tube or some different shape which can be received by the hitch receiver. The first hitch arm has a first end and a second end of square cross-sectional shape with outer dimensions slightly smaller than the inner dimensions of the hitch receiver such that the first hitch arm may be slidably positioned in the receiver with little or no "slop" or "play" there between. At a second end of the first hitch arm is an upwardly directed stub. The upwardly directed stub may be formed of a solid or hollow and round or square member or alternatively may be some other structural shape. The upwardly directed stub is integral with the second end of the first hitch arm and may be formed therewith or welded either to a plate covering the second end of the first hitch arm or directly to the second end of the hitch arm. The upwardly directed stub has a stub aperture for receiving a pin or other such fastener. Extending through the first hitch arm is a first hitch arm fastening aperture. The fastening aperture is aligned with the hitch receiver aperture and a fastening pin or other fastener, such as a screw or bolt, is placed therethrough to prevent the first hitch arm from being removed from the hitch receiver by an axial force.

Slidably positioned on the upwardly directed stub is a second upwardly directed hitch arm. The second upwardly directed hitch arm has a first end and a second end, and a substantially square cross-section. However, the cross-sectional shape may vary such that the second hitch arm receives the upwardly directed stub. The second upwardly directed hitch arm receives the stub since the stub is dimensioned to fit within the second upwardly directed hitch arm with little "slop" or "play" there between. The second hitch arm is connected to the upwardly directed stub by a pin or other fastener extending therethrough and preventing removal of the second upwardly directed hitch arm from the upwardly directed stub when the pulling vehicle begins pulling the attached trailer. The stub may comprise a protrusion or other structural stop, such as a washer, which the second hitch arm may abut to align apertures of the stub and second upwardly directed hitch arm.

Connected to a second end of the second upwardly directed hitch arm is a joint. Preferably, the joint allows at least 180 degrees of rotation about at least two axes and more preferably about 200 degrees of rotation. As exemplified in the instant embodiment, the joint is comprised of a first eyelet and a second eyelet operatively connected. In combination, the first and second eyelets allow pivoting about a vertical axis and a horizontal axis. The second eyelet may be integral with a joint post, which may be integral with a trailer. The joint post may be either fastened to the trailer or welded to the trailer.

Also exemplary in the present embodiment is a trailer having a bed, an axle with at least a first pair of wheel assemblies, and a plurality of ribs extending upwardly between an upper bed rail and a lower bed rail. Extending from the at least one bed rail may be first and second diverters. The diverters, in part, define a triangular shape positioned directly in front of the trailer tires. In this configuration, small trees, brush, and other debris are cleared from the path of the wheels, inhibiting the debris from being binding between the trailer and tires inhibiting travel. In addition, the diverters convert the pulling force of the ATV and contact with a tree to a resultant force which pushes the trailer around a tree or shrub.

All of the above outlined objectives are to be understood as exemplary only and many more objectives of the invention may be gleaned from the disclosure herein. Therefore, no limiting interpretation of the objectives noted is to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

The present invention will now be described in conjunction with the drawings, referring initially to FIGS. 1–5, hitch device 20 is depicted connecting a pulling vehicle 10 and a trailer 70. For purposes of the instant application, the pulling vehicle will be referred to as an all-terrain vehicle ('ATV'), including three or more wheels, however the hitch device 20 may be used to connect a plurality of vehicles towing a trailer, including vehicles designed for off-road travel over rugged terrain.

Figure 1:
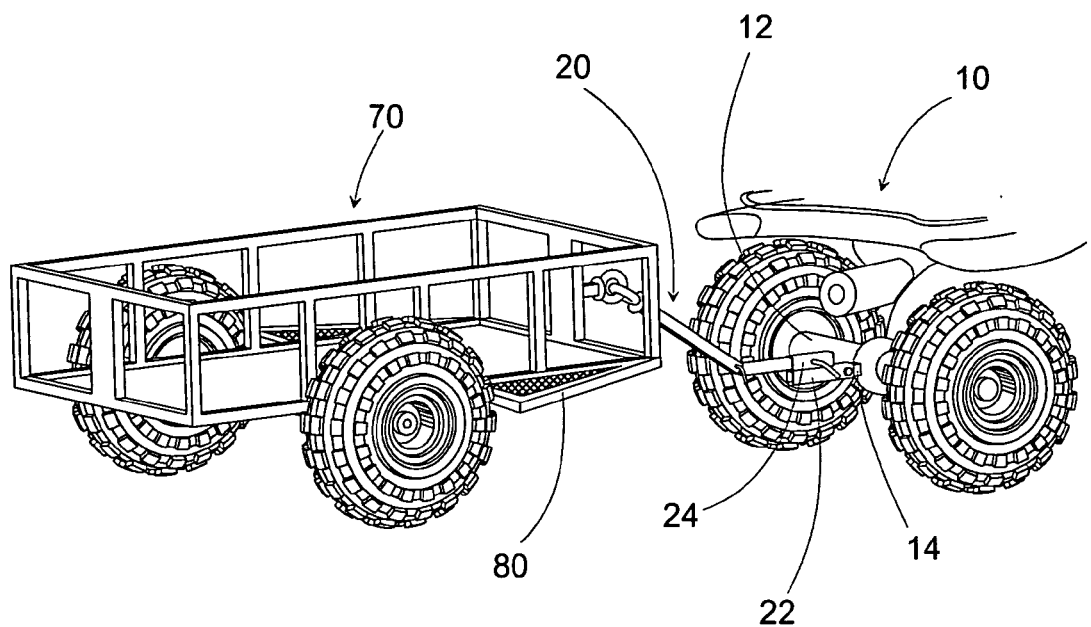
FIG. 1 shows a perspective view of the ATV, trailer and hitch device.

Referring initially to FIG. 1, a rear portion of an ATV 10 is shown having a rear axle assembly 12 connecting first and second rear wheels and tires. Extending from the rear axle assembly 12 is a receiver stub 14. The receiver stub 14 may be substantially square, as shown in FIG. 1, or may be some other structural shape which corresponds to a receiver bracket 22 wherein the stub 14 may be positioned. Alternatively, the receiver stub 14 may be fastened or welded to the rear axle assembly 12 in order to provide a strong anchor for the hitch device 12 described herein.

Figure 2:
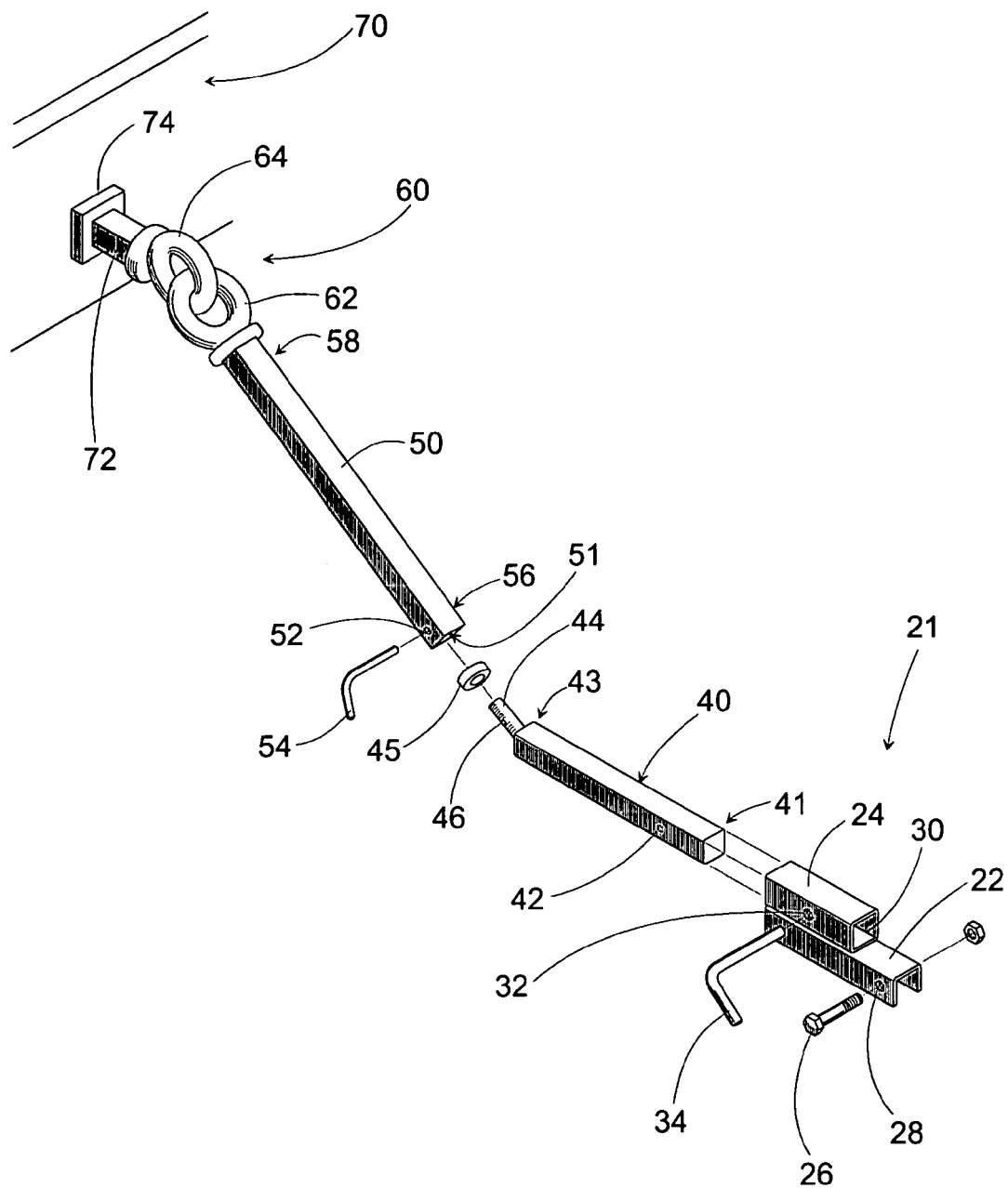
FIG. 2 shows an exploded perspective view of the hitch device of FIG. 1.
Figure 3:
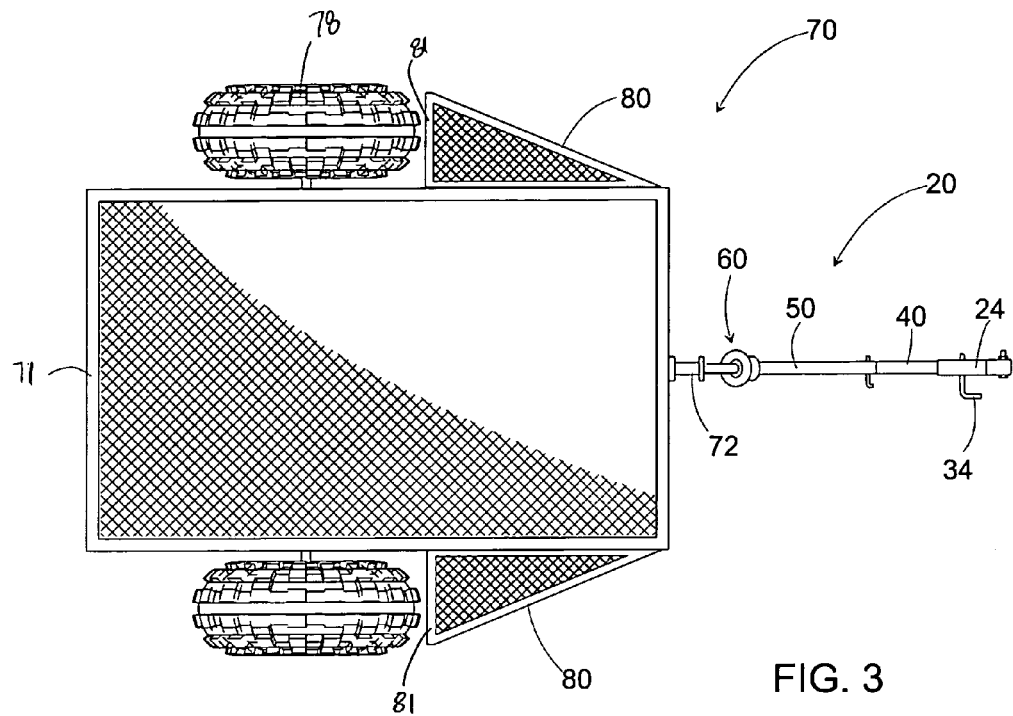
FIG. 3 shows a top view of the hitch device and trailer of FIG. 1.

Referring again to FIGS. 1–5, a hitch receiving structure 21 is shown having a substantially U-shaped receiver bracket 22 for receiving the receiver stub 14. The receiver bracket 22 includes a first fastening aperture 28 extending through two of the parallel sides of the U-shaped receiver bracket 22. When the receiver bracket 22 is placed over the receiver stub 14, the fastening aperture 28 is aligned with an aperture in the stub 14 and a fastener 26 is placed therethrough. The fastener may be a bolt and nut, as shown in FIGS. 2 and 3, or a pin extending through the receiver stub 14 and the receiver bracket 22 inhibiting removal of the first hitch arm by an axial force. Alternatively, the receiver bracket 22 may be welded or fastened to the rear axle assembly 12 in order to connect the hitch receiving structure 21 to an ATV or other pulling vehicle.

As shown in FIGS. 1, 2, 4, and 5, a hitch receiver 24 is positioned above the receiver bracket 22. The hitch receiver 24 may be substantially square in section or it may be some other shape corresponding to the shape of a first hitch arm 40. For example, the hitch receiver 24 may be formed of a square tube if the square shape is desired, or in the alternative, if a round shape is desirable, a round tube or pipe may be used. The hitch receiver 24 is hollow and therefore has a hitch arm receiving portion 30 wherein a hitch arm 40 may be positioned. The hitch receiver 24 also comprises a receiver fastening aperture 32 extending through parallel vertical walls for aligning with a fastening aperture 42 of the first hitch arm 40. When the first hitch arm 40 is slidably positioned within the hitch receiver 24, the hitch arm aperture 42 is aligned with the hitch arm receiver fastening aperture 32 and a fastener or pin 34 extends therethrough inhibiting an axial force, typical in towing, from removing the first hitch arm 40.

Figure 5:
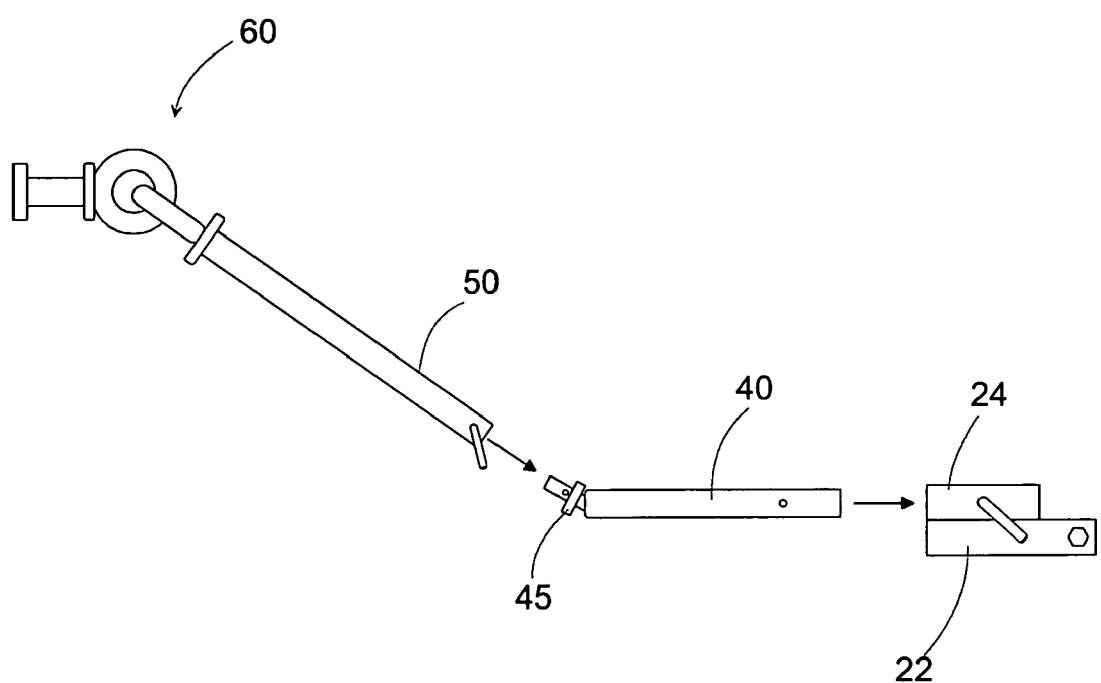
FIG. 5 shows an exploded side view of the hitch device of the present invention having a square upwardly directed stub.

The first hitch arm 40 is also shown having a substantially square cross-section and being formed of a square tube. The first hitch arm 40 may be solid or hollow and has a first end 41 and a second end 43. The hitch arm 40 is sized slightly smaller than the receiving portion 30 of the hitch receiver 24 allowing the hitch to be slidably positioned therein with minimal "slop" or "play". The hitch arm 40 may extend from the hitch receiver 24 to a position slightly beyond the rear tires of the ATV 10. At the second end 43 of the first hitch arm 40 is an upwardly directed stub 44. The stub 44 may be welded directly to the second end 43 of the first hitch arm or a plate may be disposed over the second end 43 of the first hitch arm 40 and the stub 44 integral with the plate. The upwardly directed stub 43 is positioned at an angle of between about 15 degrees and 45 degrees from the horizontal. As exemplified in the instant embodiment, the angle is about 28 degrees. Referring now to FIG. 2, the upwardly directed stub 44 is formed of a cylindrically shaped steel rod having a round cross-section and a stub aperture extending through the stub 44, normal to a longitudinal axis thereof. Alternatively, as seen in FIG. 5, the stub 44 may be square in section or some other shape allowing the stub to fit within a second upwardly directed hitch arm 50 and inhibiting rotation therebetween. In addition, disposed over the upwardly directed stub 44 may be a stop 45 providing a structure to abut the second upwardly directed hitch arm 50 and easing alignment of a stub aperture 46 and a fastening aperture 52 for fastening by a pin 54 or other fastener, such as a bolt, screw or rivet.

Extending upwardly from the second end 43 of the first hitch arm 40 is the second upwardly directed hitch arm 50 slidably positioned over the upwardly directed stub 44. The second hitch arm 50 may have a plurality of structural shapes including, as best seen in the FIGS. 2–5, a square cross-section with a first end 56 and a second end 58. The first end 56 has a stub receiving portion 51 which is slidably positioned over the upwardly directed stub 44 such that the second hitch arm 50 assumes the angle of the stub 44. In an alternative embodiment, the first and second hitch arms 40,50 may be formed together, however it is preferable to form the first and second hitch arms 40,50 separately as the second hitch arm 50 may be disconnected and rotated downwardly to provide a stand or third support point for the trailer 70.

Figure 4:
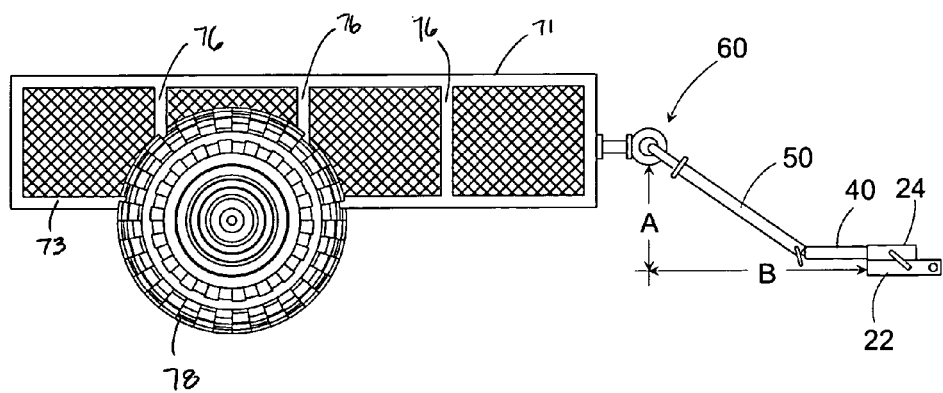
FIG. 4 shows a side view of the hitch device and trailer of FIG. 1.

At the second end 58 of the second upwardly directed hitch arm 50 is a joint 60 which allows rotation about at least two axes. As shown FIG. 2, the joint 60 comprises a first eyelet 62 integral with a second end of the upwardly directed hitch arm 50. A second eyelet 64 is interconnected with the first eyelet 62 forming the joint 60. In this configuration, the joint 60 allows at least about 180 degrees, preferably about 200 degrees, of rotation about each of a vertical axis and a horizontal axis. As shown in FIG. 4, the joint 60 is located near the trailer 70 rather than the ATV as typical and is spaced apart from the hitch receiving structure 21 a preselected distance "B" and offset vertically from the structure 21 a preselected distance "A". The preselected distance "B" may be at least about one-half (½) the width of the trailer 70. In this configuration, the trailer may turn at least about 90 degrees in either a left or right direction without binding with the ATV 10. The vertical offset "A" inhibits the hitch device 20 from bottoming out or digging into the substrate therebelow as the device moves through sharp crests and valleys encountered in off-road travels. Rotation at a position spaced from the connection to the ATV 10 inhibits the trailer 70 from binding with the ATV 10. This allows the trailer 70 to follow the ATV 10 over rugged terrain and about sharp turns without binding. In the alternative, the joint 60 maybe formed of a plurality of designs such as, for example, a universal joint, a ball and socket joint, or some other joint allowing motion through a plurality of planes, however these alternative joints may not provide the same range of rotation as provided by the instant joint.

Integral with the second eyelet 64 is a joint post 72. The joint post 72 is connected to a plate 74 which may be fastened or welded to the trailer 70.

The trailer 70 includes at least one bed rail defining a bed area. As shown in FIGS. 1, 3, and 4, the trailer 70 has an upper bed rail 71, a lower bed rail 73, and a plurality of ribs 76 extending between the upper and lower bed rails defining a bed area. The ribs 76 may either extend substantially vertically or at an angle. Extending perpendicularly across the bottom portion of the trailer 70 is an axle having a first and second wheel assembly 78 at respective ends thereof. Each wheel assembly 78 includes at least one wheel and one tire mounted thereto. Extending from the at least one bed rail, and preferably the lower bed rail 73, at an angle are first and second diverters 80. The angle between the lower bed rail 73 and each of the diverters 80 may be between about 5 degrees and 90 degrees, and as exemplified in FIG. 3, about 30 degrees. The diverters 80, in combination with the lower bed rail 73 and a strengthening leg 81, define a triangular shape. When in use, the front portion of trailer 70 may encounter a tree if, for example, the ATV 10 makes a sharp turn when a tree is located between the ATV 10 and trailer 70. When one of the diverters 80 contacts the tree, the pulling force of the ATV 10 and the force of the diverter 80 on the tree define a resultant force which pushes the trailer 70 away from or around the tree. The angle between the diverter leg 80 and the lower bed rail 73 may be between 5 and 90 degrees, and preferably about 30 degrees. As one of ordinary skill in the art will understand, angles greater than 45 degrees result in less resultant force to push the trailer 70 around the tree.

In use, the hitch receiving structure 21 comprising the receiver bracket 22 is disposed over the receiver stub 14 and a fastener 26 is placed through aligned apertures in the receiver bracket 22 and stub 14. Next, the first hitch arm 40 is slidably positioned in the hitch receiver 24 and receiver fastening aperture 32 is aligned with the first hitch arm aperture 42. A pin 34 or other fastener is placed through the receiver bracket 24 and the first hitch arm 40. At the second end of the first hitch arm 40 is the upwardly directed stub 44, described above. The second upwardly directed hitch arm 50 is disposed over the upwardly directed stub 44 and the fastening aperture 52 is aligned with the stub aperture 46 by abutting the hitch arm 50 with the stop 45 on the stub 44. A fastening pin 54 is placed through the hitch arm 50 and stub aperture 46 inhibiting removal of the second hitch arm 50. The joint 60, located at the second end of hitch arm 50, is connected to the trailer 70 or may be integral therewith such that the trailer 70 is ready to be pulled by for instance an ATV. This hitch design places the joint at a preselected spaced distance from the pulling vehicle such that the trailer does not bind with the pulling vehicle as the vehicle and trailer traverse rough terrain.

I claim:

1. A hitch device for use with an all-terrain vehicle and trailer, comprising:
   a hitch receiving structure;
   a first hitch arm received in said hitch receiving structure;
   a second upwardly directed hitch arm integral with a second end of said first hitch arm; and,
   a joint connected to said second hitch arm and spaced a preselected vertical and horizontal distance from said hitch receiving structure;
   wherein said joint provides pivotal motion about multiple axes said preselected distances from said hitch receiving structure.

2. The hitch device of claim 1, said joint being a preselected horizontal distance "B" from said hitch receiving structure.

3. The hitch device of claim 2, said horizontal distance "B" being at least about one-half a width of a said trailer.

4. The hitch device of claim 1, said joint being a preselected vertical distance from said hitch receiving structure.

5. The hitch device of claim 1, said joint connected to said trailer by a joint post.

6. The hitch device of claim 1, said hitch receiving structure including a hitch bracket having at least one fastening aperture.

7. The hitch device of claim 6, said hitch receiving structure including a hitch arm receiving portion and a fastening aperture.

8. The hitch device of claim 1, said first hitch arm received by a hitch receiver and fastened thereto by a fastener.

9. The hitch device of claim 8, said fastener being a pin.

10. The hitch device of claim 1, further comprising an upwardly directed stub extending from said second end of said first hitch arm.

11. The hitch device of claim 10, said second upwardly directed hitch arm receiving said upwardly directed stub and assuming an angle of said stub.

12. The hitch device of claim 11, said angle being between about 15 and 45 degrees.

13. The hitch device of claim 12, said angle being about 28 degrees.

14. The hitch device of claim 11, said stub having a fastening aperture and said upwardly directed hitch arm having a corresponding fastening aperture, said fastening apertures being aligned and fastened there through.

15. The hitch device of claim 1, said joint allowing rotation about two axes.

16. The hitch device of claim 1, said joint comprising a first eyelet and a second interconnected eyelet.

17. The hitch device of claim 16, said second eyelet operably connected to a joint post.

18. An ATV hitch device for use with an ATV and a trailer, comprising:
   an ATV having a hitch receiving structure integral with a rear portion thereof;
   a first hitch arm received in said hitch receiving structure;
   a second upwardly directed hitch arm integral with a second end of said first hitch arm;
   a joint operably connected to a second end of said second upwardly directed hitch arm and being distal to said hitch receiving structure; and, said hitch receiving structure being a preselected vertical and preselected horizontal distance from said joint;

wherein said joint provides pivotal motion about multiple axes said preselected distances from said hitch receiving structure.

19. The ATV hitch device of claim 18, said hitch receiving structure integral with a rear axle assembly.

20. The ATV hitch device of claim 19, said first hitch arm slidably received by said ATV hitch receiving structure and fastened therein.

21. The ATV hitch device of claim 20, an upwardly directed stub extending from a second end of said first hitch arm distal of said ATV hitch receiving structure.

22. The ATV hitch device of claim 21, said upwardly directed hitch arm receiving said upwardly directed stub and fastened thereto.

23. The ATV hitch device of claim 22, a first eyelet integral with a second end of said upwardly directed hitch arm.

24. The ATV hitch device of claim 23, said first eyelet connected to a second eyelet and forming said joint.

25. The ATV hitch device of claim 24, said joint connected to a trailer.

26. A hitch device and trailer for use with an all-terrain vehicle, comprising:
a joint being a preselected horizontal distance and a preselected vertical distance from a hitch receiving structure and connected to a trailer;
said hitch receiving structure having a spaced apart relationship with a joint, wherein said joint provides pivotal motion about multiple axes said spaced distance from said hitch receiving structure.

27. The hitch device and trailer of claim 26, said hitch receiving structure and a first hitch arm fastened by a pin extending through said hitch receiving structure and a first hitch arm.

28. The hitch device and trailer of claim 26, a further hitch arm having an upwardly directed stub extending from a second end of the first hitch arm and an upwardly directed hitch arm slidably positioned on said upwardly directed stub and assuming the angle of said stub.

29. The hitch device and trailer of claim 28, said upwardly directed hitch arm fastened to said upwardly directed stub by a pin.

30. The hitch device and trailer of claim 29, said upwardly directed hitch arm having a first end and a second end, said second end having a first eyelet.

31. The hitch device and trailer of claim 30, a second eyelet operatively connected to said first eyelet and forming said joint.

32. The hitch device and trailer of claim 31, said second eyelet connected to a joint post, said joint post integral with a trailer.

33. The hitch device and trailer of claim 26, further comprising diverters extending at angle of about 30 degrees from a lower bed rail of said trailer.

34. An all-terrain trailer and hitch device for use with an all-terrain vehicle, comprising:
at least one bed rail defining a bed area;
an axle extending across a lower portion of said bed and perpendicular to a longitudinal axis of said bed;
first and second diverters extending from a lower bed rail;
first and second wheel assemblies connected to said axle;
a hitch device extending from a front portion of said trailer;
said hitch device including:
a first hitch arm having a first end and a second end;
a second upwardly directed hitch arm fastened to a second end of said first hitch arm; and,
a joint connected to said second hitch arm and spaced a preselected vertical distance and a preselected horizontal distance from a hitch receiving structure;
wherein said joint provides pivotal motion about multiple axes said preselected distances from said hitch receiving structure.

35. The all-terrain trailer of claim 34, said diverters extending from said lower bed rail at an angle of between about 5 degrees and 90 degrees.

36. The all-terrain trailer of claim 35, said angle being about 30 degrees.

37. The all-terrain trailer of claim 34, said at least one bed rail being an upper bed rail and a lower bed rail.

38. The all-terrain trailer of claim 37, a plurality struts extending between said upper bed rail and said lower bed rail.

* * * * *